J. H. L'ABÉE LUND.
MAGNETIC SUN DIAL.
APPLICATION FILED JUNE 8, 1915.
1,166,611.
Patented Jan. 4, 1916.
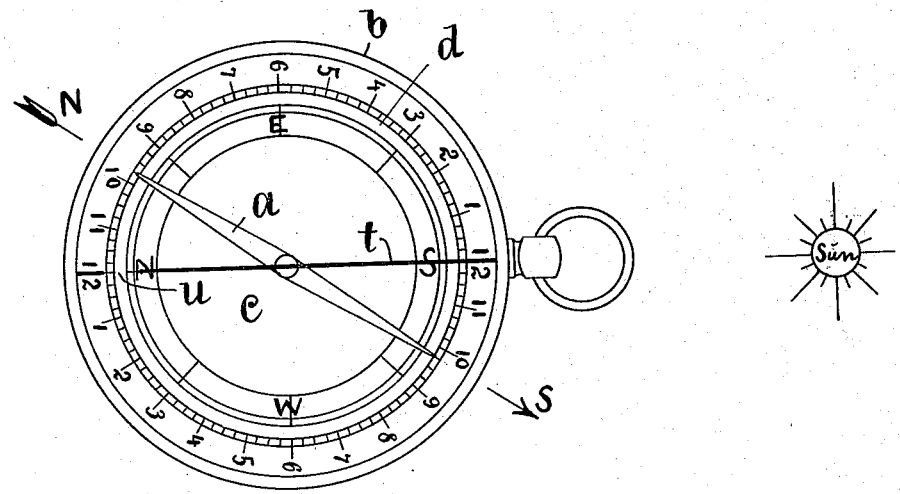
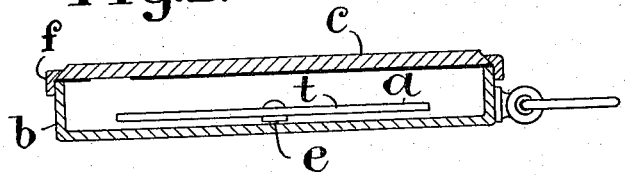
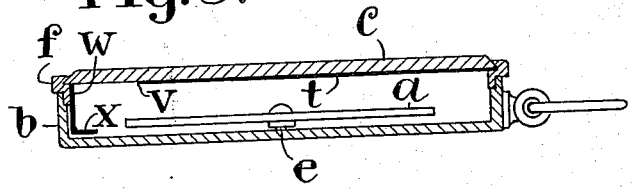

UNITED STATES PATENT OFFICE.

JOHAN HENRIK L'ABÉE LUND, OF CHRISTIANIA, NORWAY.

MAGNETIC SUN-DIAL.

1,166,611.   Specification of Letters Patent.   Patented Jan. 4, 1916.

Application filed June 8, 1915. Serial No. 32,818.

*To all whom it may concern:*

Be it known that I, JOHAN HENRIK L'ABÉE LUND, a subject of the King of Norway, residing at Christiania, Norway, have invented certain new and useful Improvements in Magnetic Sun-Dials; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the kind of sun dials which is combined with a compass. The sun dials of this kind hitherto known have been complicated or have had a construction, which did not secure accuracy in use.

According to my invention the sun dial consists of a usual compass, which can be carried in the pocket and which is different from the common compasses only therein that it is provided with a graduated hour disk and that its glass cover has a line drawn along a diameter serving to throw a shadow on the said hour disk.

In the annexed drawing I have shown an illustration of a preferred form of my invention.

Figure 1 is a top view and Fig. 2 a cross section of the magnetic sun dial. Fig. 3 shows a modification.

$a$ is the magnetic needle turning on the pivot $e$ within the casing $b$, the back wall of which is provided with a circumferential hour disk $d$.

$c$ is the glass cover of the compass and $t$ indicates a non-transparent line on the inside of the glass cover drawn diametrically through its center. At $u$ this line is interrupted for a short distance. The glass cover is fitted into a rim or holder $f$, which is so fixed on the casing that it can be adjusted by rotation.

This magnetic sun dial is used in the following manner: Knowing the variation of the compass the glass cover is turned so, that the line $t$ forms an angle with the N—S line of the compass corresponding with the variation. The instrument is then held horizontally, so that the line $t$ is directed against the sun. This can be accurately determined by way of the shadow, which the line throws on the bottom of the casing and accurate determination of the correct position of the instrument is easily obtained by way of the open space $u$ in the line $t$, because as the shadow will be seen right below this opening the eye is facilitated in determining the position of the shadow, which is, as will be understood, to fall right below the line $t$. When the correct position of the instrument is obtained in this manner, the compass needle will point to the hour, which may be read on the hour disk $d$. In the drawing it is supposed, that the place where the instrument is used has no variation of compass. The sun dial shows in this instance 9, 45 min., which is the true time of the place. In most cases not the true time but the middle time is asked for and instead of adjusting the glass cover as above explained it has then to be adjusted by means of a watch, a mark being placed on the dial, where the line $t$ points, when the compass needle shows the same time as the watch. The apparatus may also be used in the manner that the instrument is held horizontally in such position that the magnetic needle will point on the N—S line of the compass or on the said mark. Thereupon the glass cover is turned so that the line points to the sun. The shadow of the line $t$ will then indicate the hour on the hour disk.

The line $t$ may be formed in the glass itself by an etching operation or the like, or it may consist of a thin string of a suitable material fixed on the inside of the glass cover.

In the modification shown in Fig. 3 the nontransparent line $t$ ends at $v$. Fixed to the rim or holder $f$, at a point lying in the prolongation of the line $t$, is a piece of wire $w$ bent at right angles so that the part $x$ which forms an indicator points radially inward. This arrangement secures a more correct determination of the position of the shadow, as it eliminates the fault caused by the fact that the eye of the observer may not be placed perpendicularly above the nontransparent line.

Claims:

1. A magnetic sun dial, comprising a compass case provided with an adjustable glass cover having a non-transparent line disposed diametrically, so as to cause a shadow to be thrown on the bottom of the casing.

2. In a magnetic sun dial, the combination with a compass case of an adjustable glass cover carrying a non-transparent line which terminates a short distance from the periphery of the glass cover for the purpose described.

3. In a magnetic sun dial the combination with a compass case having an adjustable glass cover with a non-transparent line which terminates a short distance from the periphery of the glass cover, of an indicator near the bottom of the compass lying in the same axial plane as the non-transparent line.

In testimony that I claim the foregoing as my invention, I have signed my name in presence of two subscribing witnesses.

JOHAN HENRIK L'ABÉE LUND.

Witnesses:
M. E. GUTTORMSER,
C. F. HANSEN.

Copies of this patent may be obtained for five cents each, by addressing the "Commissioner of Patents, Washington, D. C."